(12) United States Patent
Nelson

(10) Patent No.: US 11,554,880 B2
(45) Date of Patent: Jan. 17, 2023

(54) TAIL TIE-DOWN

(71) Applicant: Pete L. Nelson, Challis, ID (US)

(72) Inventor: Pete L. Nelson, Challis, ID (US)

( * ) Notice: Subject to any disclaimer, the term of this patent is extended or adjusted under 35 U.S.C. 154(b) by 0 days.

(21) Appl. No.: 17/303,439

(22) Filed: May 28, 2021

(65) Prior Publication Data

US 2021/0354850 A1 Nov. 18, 2021

Related U.S. Application Data

(62) Division of application No. 16/162,314, filed on Oct. 16, 2018, now Pat. No. 11,021,267.

(60) Provisional application No. 62/575,220, filed on Oct. 20, 2017.

(51) Int. Cl.
| | | |
|---|---|---|
| *B64F 1/12* | (2006.01) | |
| *B64F 5/10* | (2017.01) | |
| *B64C 1/10* | (2006.01) | |

(52) U.S. Cl.
CPC ............ *B64F 1/12* (2013.01); *B64C 1/10* (2013.01); *B64F 5/10* (2017.01)

(58) Field of Classification Search
CPC ......... B60R 11/00; B60R 9/00; B61D 45/001; F64C 1/10; B64F 1/029; B64F 1/12; B64F 1/125; B64F 1/14; B64F 5/10; E05B 73/0005
See application file for complete search history.

(56) References Cited

U.S. PATENT DOCUMENTS

| | | | |
|---|---|---|---|
| 851,720 A | | 4/1907 | Williamson |
| 973,777 A | | 10/1910 | Grissom |
| 1,127,844 A | | 2/1915 | Anderson |
| 1,294,951 A | | 2/1919 | Rohrbacher |
| 1,342,918 A | | 6/1920 | Legg |
| 1,669,446 A | | 5/1928 | Bowers |
| 1,690,643 A | | 11/1928 | Lavender |
| 2,249,764 A | | 7/1941 | Hothersall |
| 2,333,559 A | | 11/1943 | Grady et al. |
| 2,478,708 A | * | 8/1949 | Raiche ............... B64F 1/22 244/129.1 |
| 2,648,326 A | | 8/1953 | Epstein |
| 2,648,511 A | | 8/1953 | Epstein |
| 2,742,865 A | | 4/1956 | Chandler et al. |
| 2,908,061 A | | 10/1959 | Adams |
| 2,965,342 A | | 12/1960 | Goldstone |
| 3,004,740 A | | 10/1961 | Lane |
| 3,181,823 A | | 5/1965 | Gillmore |
| 3,185,413 A | | 5/1965 | Walker |
| 3,304,031 A | | 2/1967 | Mulquin |
| 3,602,461 A | * | 8/1971 | Cody .................. B64F 1/06 244/63 |
| 3,602,468 A | | 8/1971 | Stone |
| 3,659,824 A | | 5/1972 | Johnson |

(Continued)

*Primary Examiner* — Christopher Garft
(74) *Attorney, Agent, or Firm* — Knobbe Martens Olson & Bear, LLP

(57) ABSTRACT

A tie-down for attachment to an aft tail section of an aircraft for inhibiting damage to the aircraft when the aircraft is on the ground is disclosed. The tie-down has a mount member configured to attach to the aft tail section and a projection member supported by the mount member. The projection member extends in a generally downward direction from the mount member so as to provide a contact surface with the ground that is lower than the aft tail section.

20 Claims, 11 Drawing Sheets

(56) References Cited

U.S. PATENT DOCUMENTS

| | | | |
|---|---|---|---|
| 3,685,771 A * | 8/1972 | Babich | B64F 1/16 244/115 |
| 3,750,241 A | 8/1973 | Bootha | |
| 3,809,350 A | 5/1974 | Lane | |
| 3,818,958 A | 6/1974 | Clarke et al. | |
| 3,904,154 A | 9/1975 | Jones | |
| 4,106,197 A | 8/1978 | Russell | |
| 4,173,856 A | 11/1979 | Fricker | |
| D257,947 S | 1/1981 | Reynoso | |
| 4,262,922 A | 4/1981 | Nelson | |
| 4,318,234 A | 3/1982 | Charles et al. | |
| 4,397,254 A | 8/1983 | Deady | |
| 4,470,564 A | 9/1984 | Johnson | |
| 4,592,686 A | 6/1986 | Andrews | |
| H256 H | 4/1987 | Annibale | |
| 4,719,773 A | 1/1988 | Alberts | |
| 4,738,216 A | 4/1988 | Camarota et al. | |
| 4,944,683 A | 7/1990 | Leonardo | |
| 5,020,748 A | 6/1991 | Okajima | |
| 5,172,879 A | 12/1992 | Calmettes et al. | |
| 5,275,601 A | 1/1994 | Gogolewski et al. | |
| 5,320,193 A | 6/1994 | Bongiovanni et al. | |
| 5,478,033 A | 12/1995 | Hungerford, Jr. | |
| 5,522,571 A | 6/1996 | Simmons | |
| 5,581,924 A | 12/1996 | Peterson | |
| 5,697,585 A | 12/1997 | Hungerford, Jr. | |
| 5,730,608 A | 3/1998 | Legrady | |
| 5,746,401 A | 5/1998 | Condon | |
| 6,007,023 A * | 12/1999 | Lehman | B64F 1/12 244/63 |
| 6,026,545 A | 2/2000 | Duggan | |
| 6,481,365 B1 * | 11/2002 | Currie | B64F 1/16 116/67 R |
| 6,557,805 B1 | 5/2003 | Snyder | |
| 6,581,885 B2 | 6/2003 | Polad | |
| 6,685,153 B2 | 2/2004 | Foreman | |
| 6,764,259 B1 * | 7/2004 | Preta | B60P 7/0807 410/106 |
| 6,805,321 B2 | 10/2004 | Rodier et al. | |
| 7,083,151 B2 | 8/2006 | Rapp | |
| 7,240,446 B2 | 7/2007 | Bekker | |
| 7,278,893 B1 | 10/2007 | Frantz | |
| 7,310,934 B1 | 12/2007 | Jensen et al. | |
| 7,424,992 B1 | 9/2008 | Dziedzic | |
| 7,434,444 B2 | 10/2008 | Browning | |
| 7,490,600 B2 | 2/2009 | Kopp | |
| 7,562,853 B2 | 6/2009 | Mazzola | |
| 7,559,512 B1 | 7/2009 | diGirolamo et al. | |
| 7,651,305 B1 | 1/2010 | Boyd et al. | |
| 7,658,027 B2 | 2/2010 | Jain et al. | |
| 7,690,164 B2 | 4/2010 | Walker et al. | |
| 7,784,209 B2 | 8/2010 | Greer | |
| 7,942,383 B2 | 5/2011 | Tharp | |
| 7,992,262 B2 | 8/2011 | Thompson | |
| 8,065,843 B2 | 11/2011 | Timothy et al. | |
| 8,251,410 B1 | 8/2012 | Carter et al. | |
| 8,491,237 B2 | 7/2013 | Parkinson | |
| 8,672,270 B2 | 3/2014 | Vas | |
| 8,851,543 B2 | 10/2014 | Kostecki | |
| 8,925,858 B2 | 1/2015 | Spiral | |
| 9,145,948 B2 | 9/2015 | Corio | |
| 9,669,928 B2 * | 6/2017 | Eilken | B64D 9/00 |
| 2002/0032953 A1 * | 3/2002 | Maurer | B64F 1/16 24/136 R |
| 2003/0180118 A1 * | 9/2003 | Alba | G06Q 10/087 411/400 |
| 2004/0127899 A1 | 7/2004 | Konieczynski et al. | |
| 2004/0173232 A1 | 9/2004 | Chang et al. | |
| 2005/0247234 A1 | 11/2005 | Early et al. | |
| 2005/0273105 A1 | 12/2005 | Konieczynski et al. | |
| 2006/0175466 A1 * | 8/2006 | Snediker | B64C 39/028 244/110 G |
| 2006/0230661 A1 | 10/2006 | Bekker | |
| 2007/0000234 A1 * | 1/2007 | Anderson | F02K 1/46 60/770 |
| 2007/0215140 A1 | 9/2007 | Kopp | |
| 2007/0221201 A1 | 9/2007 | Kopp | |
| 2007/0227527 A1 | 10/2007 | Kopp | |
| 2007/0241242 A1 | 10/2007 | Kopp | |
| 2008/0257983 A1 | 10/2008 | Boys | |
| 2008/0289163 A1 * | 11/2008 | Piasse | B64F 5/40 29/402.08 |
| 2009/0024170 A1 | 1/2009 | Kirschman | |
| 2009/0294744 A1 * | 12/2009 | Tharp | B66D 3/02 254/227 |
| 2010/0102167 A1 | 4/2010 | Dital | |
| 2010/0223764 A1 | 9/2010 | Prevot et al. | |
| 2011/0147521 A1 | 6/2011 | Delahaye et al. | |
| 2014/0008494 A1 | 1/2014 | Vas | |
| 2015/0096151 A1 * | 4/2015 | Corio | B64F 1/12 24/115 R |
| 2015/0191255 A1 | 7/2015 | Zolich et al. | |
| 2016/0016676 A1 | 1/2016 | Corio | |
| 2016/0194094 A1 * | 7/2016 | Eilken | B21J 15/142 29/524.1 |
| 2017/0029105 A1 * | 2/2017 | Ferren | B64F 3/02 |
| 2018/0099764 A1 | 4/2018 | Schill et al. | |
| 2019/0118975 A1 | 4/2019 | Nelson | |

* cited by examiner

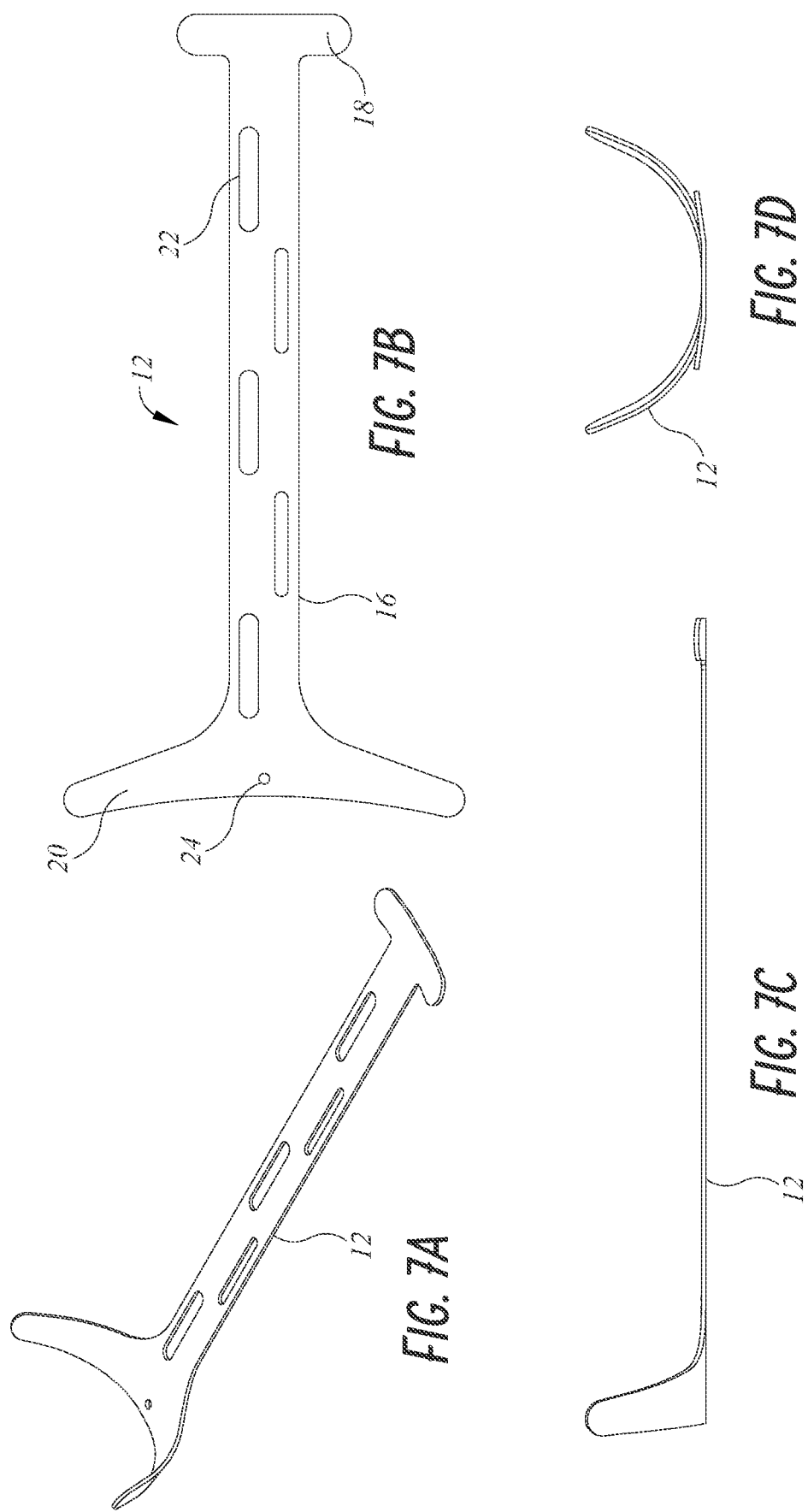

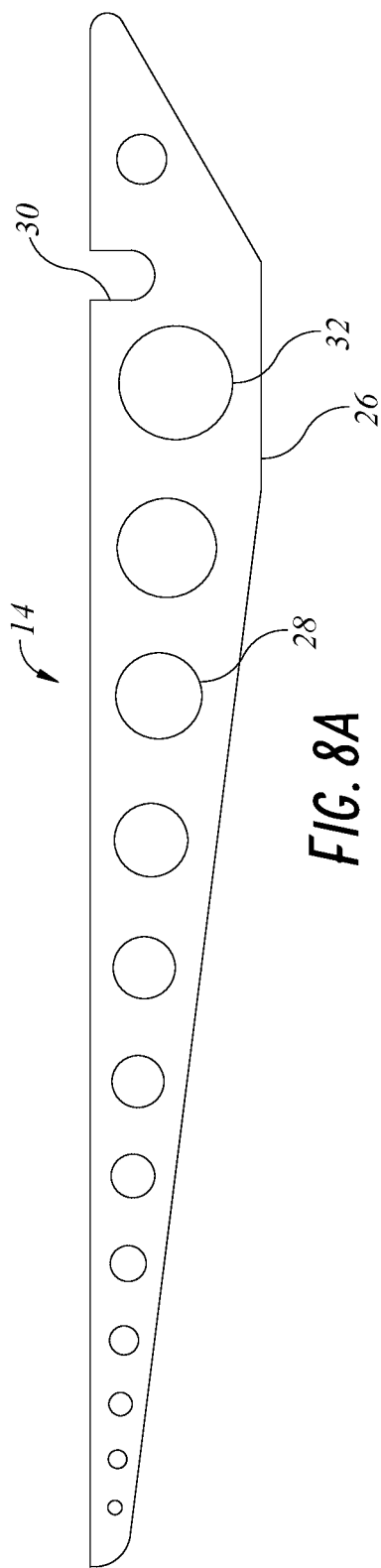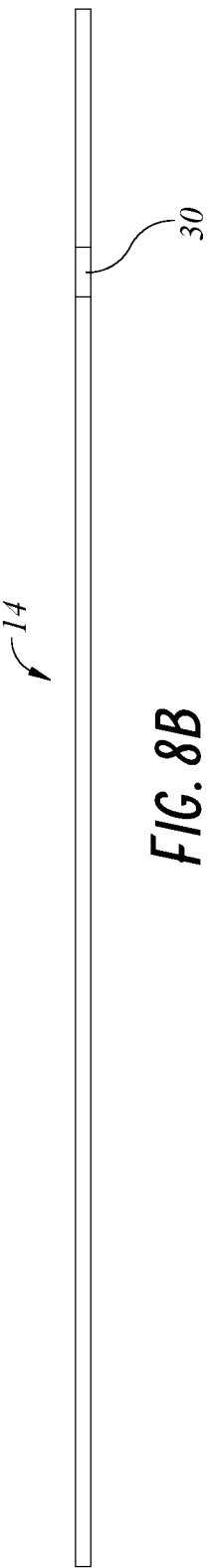
FIG. 8A
FIG. 8B

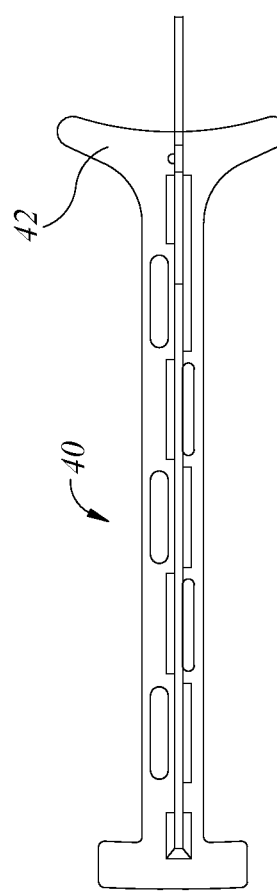
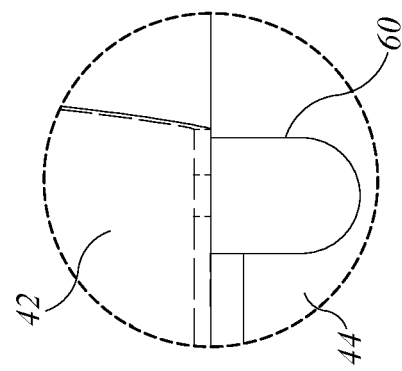
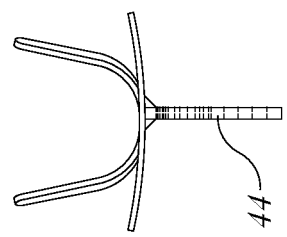
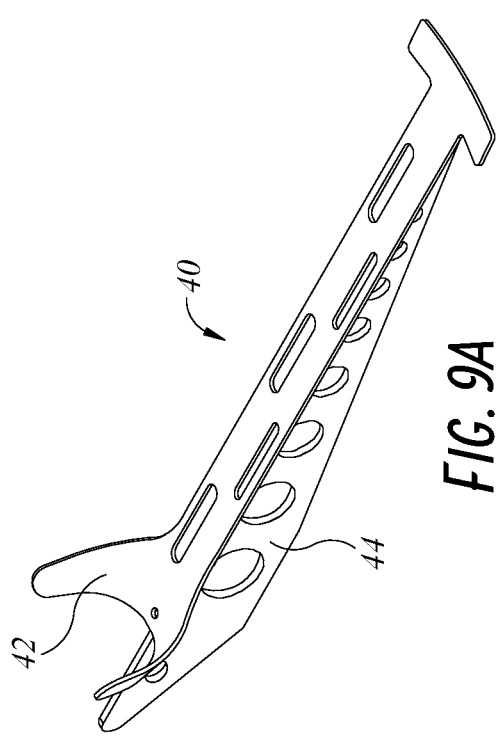
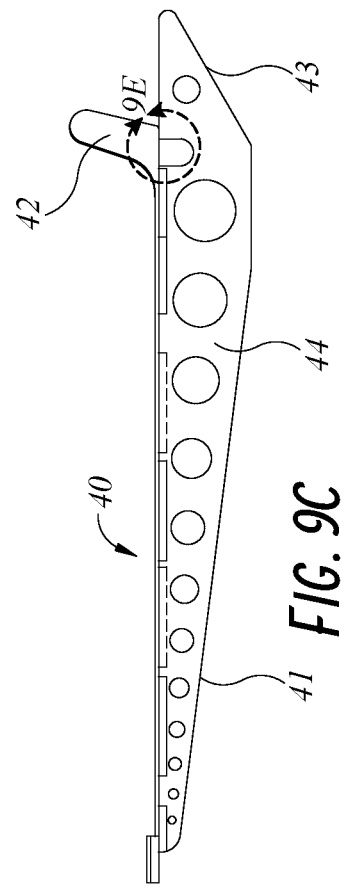
FIG. 9B
FIG. 9E
FIG. 9D
FIG. 9A
FIG. 9C

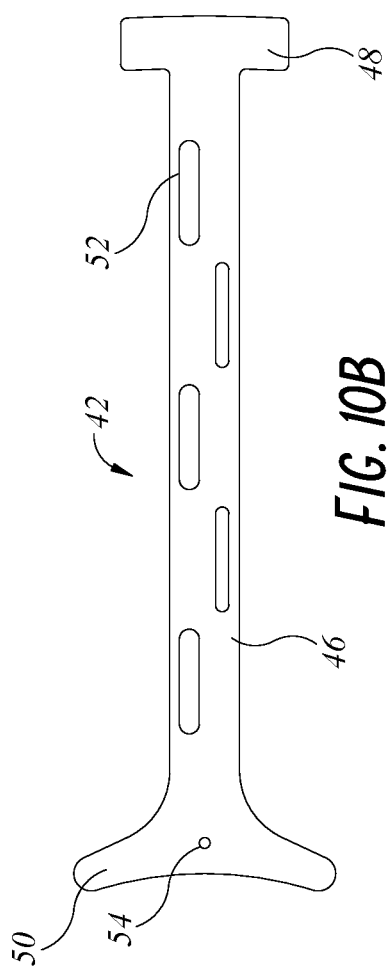
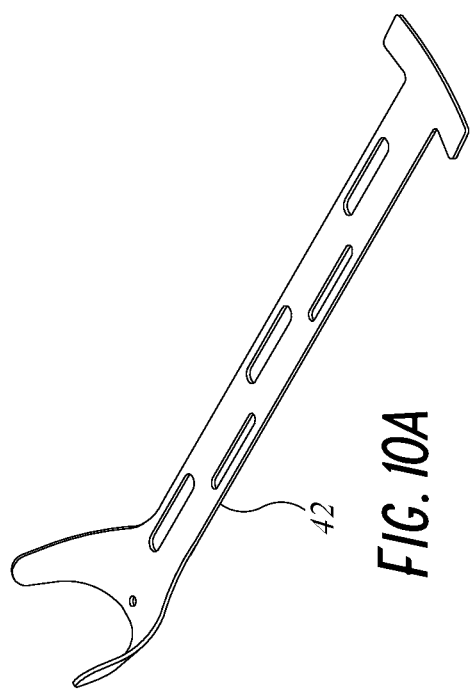
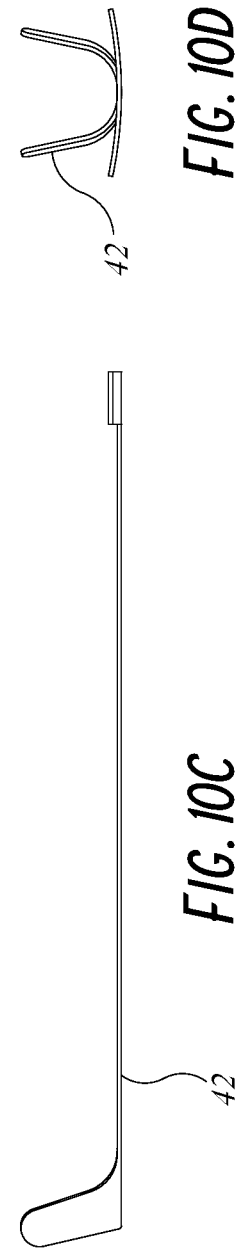

TAIL TIE-DOWN

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application is a divisional application of U.S. patent application Ser. No. 16/162,314, filed Oct. 16, 2018, and entitled "TAIL TIE-DOWN," which claims benefit under 35 U.S.C. 119(e) to U.S. Provisional Patent Application No. 62/575,220 filed on Oct. 20, 2017, the entire disclosures of which are hereby incorporated by reference herein in their entirety.

BACKGROUND

Field

Certain aspects of the present disclosure generally relate to a novel tie-down for a tail of an aircraft. Specifically, the aircraft can be manufactured to include the tie-down or the traditional design of the aircraft can be modified to include the tie-down so as to improve the aircraft's longevity by preventing damage caused by inadvertent contact of the tail with the ground.

Description of the Related Art

Certain conventional aircraft 1 may include a tie down ring 2 or other structure extending down from an aft tail section 4 of the aircraft 1. However, such structures may not prevent damage to, for example, an aft bulkhead 6, horizontal stabilizers 8, vertical stabilizers, rudder, and tail cone 9 if the aft tail section 4 or tail cone 9 inadvertently contact the ground. Exemplary drawings of an aircraft 1 with tail damage due to contact with the ground are provided in FIGS. 1-3.

FIG. 1 is a bottom view of a damaged aft tail section 4 of the aircraft 1 due to the tie down ring 2 contacting the ground. FIG. 2 is a view with the tail cone 9 removed from an aft bulkhead 6 of the aircraft 1. The aft bulkhead 6 is damaged due to contact between the tie down ring 2 and the ground. FIG. 3 is a side view of the damaged aft bulkhead 6 from FIG. 2. The damage illustrated in FIGS. 1-3 was caused by the tie down ring 2 digging into the soil and being partially pulled out of the aft bulkhead 6. As such, systems and methods are needed to solve these common problems and others for newly manufacturer as well as retrofit of existing aircraft.

SUMMARY

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

An aspect of the disclosure includes a tie-down for attachment to an aft tail section of an aircraft for inhibiting damage to the aircraft when the aircraft is on the ground is disclosed. The tie-down comprises a mount member configured to attach to the aft tail section and a projection member supported by the mount member and extending in a generally downward direction from the mount member so as to provide a contact surface with the ground that is lower than the aft tail section.

Another aspect of the disclosure includes a method for installing a tie-down to a portion of an aft tail section of an aircraft. The tie-down inhibiting damage to the aft tail section when the aircraft is on the ground. The method comprises removing a tail tie-down ring from the aft tail section of the aircraft, removing one or more rivets from the portion of the aft tail section, fitting the tie-down to the portion of the aft tail section, and securing the tie-down to the aft tail section with one or more fasteners.

Another aspect of the disclosure include an aircraft that comprises a fuselage having an aft tail section spanning at least between a first bulkhead and a second bulkhead and a tie-down attached to the aft tail section at the first bulkhead and the second bulkhead. The tie-down extending in a generally downward direction so as to provide a contact surface with the ground that is lower than the aft tail section.

In certain embodiments, the contact surface is a lower edge of the projection member.

In certain embodiments, the mount member is sized and shaped to substantially cover at least a lower portion of the aft tail section.

In certain embodiments, the lower portion of the aft tail section extends between two bulkheads of the aircraft.

In certain embodiments, the mount member has a sufficient length to attach to the aircraft at locations of two bulkheads.

In certain embodiments, the two bulkheads are most rearward of the aircraft.

In certain embodiments, the two bulkheads include a forward bulkhead and an aft bulkhead.

In certain embodiments, at least a portion of the mount member is sized and shaped to cradle the aft bulkhead.

In certain embodiments, at least a portion of the mount member is sized and shaped to cradle the forward bulkhead.

In certain embodiments, the tie-down is sized and shaped to reinforce and strengthen the aft bulkhead.

In certain embodiments, the mount member is configured to attach to the aft tail section at at least two points.

In certain embodiments, the contact surface is formed by one or more planar surfaces.

In certain embodiments, the tie-down is manufactured from aluminum.

In certain embodiments, the tie-down is sized and shaped to prevent the aft tail section from contacting the ground.

In certain embodiments, the tie-down contacts but does not dig in to the ground when installed on the aircraft.

BRIEF DESCRIPTION OF THE DRAWINGS

The features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will now be described with additional specificity and detail through use of the accompanying drawings.

FIG. 7A is a front perspective view of an embodiment of the mount member from FIG. 6A.

FIG. 7B is a top view of the mount member from FIG. 7A.

FIG. 7C is a side view of the mount member from FIG. 7A.

FIG. 7D is an end view of the mount member from FIG. 7A looking forward.

FIG. 8A is a side view of the projection member from FIG. 6A.

FIG. 8B is a top view of the projection member from FIG. 6A.

FIG. 9A is a front perspective view of an assembly of another exemplary embodiment of the tie-down from FIG. 4 in which aspects of the present disclosure can be employed and includes a mount member and a projection member.

FIG. 9B is a bottom view of the tie-down from FIG. 9A.

FIG. 9C is a side view of the tie-down from FIG. 9A.

FIG. 9D is an end view of the tie-down from FIG. 9A looking aft.

FIG. 9E is an enlarged partial view taken from FIG. 9C and showing a slot which facilitates access for attachment of the tie-down to the aircraft.

FIG. 10A is a front perspective view of an embodiment of the mount member from FIG. 9A.

FIG. 10B is a top view of the mount member from FIG. 9A.

FIG. 10C is a side view of the mount member from FIG. 9A.

FIG. 10D is an end view of the mount member from FIG. 9A looking aft.

FIG. 21 is a lower perspective view of the aircraft from FIGS. 2 and 3 with the tie-down ring removed and the tie-down installed to the aircraft. The tail cone is removed from the aircraft for clarity.

DETAILED DESCRIPTION

Figure 1:
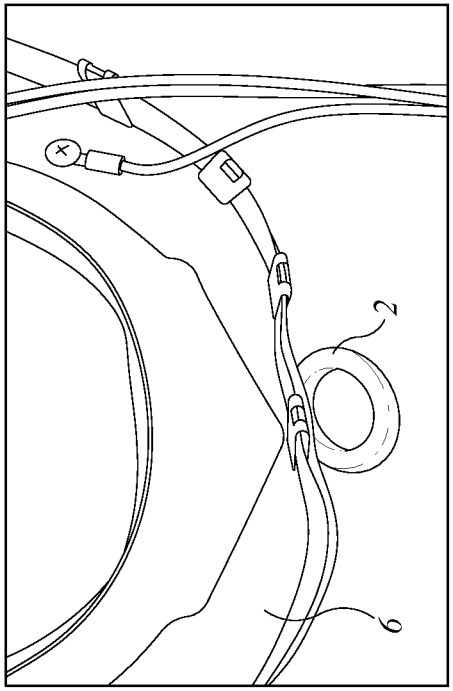
FIG. 1 is a bottom side view of a damaged tail of an aircraft due to a tie down ring contacting the ground.

Various aspects of the novel systems, apparatuses, and methods are described more fully hereinafter with reference to the accompanying drawings. The teachings of this disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. The detailed description and drawings are merely illustrative of the disclosure rather than limiting, the scope of the disclosure being defined by the appended claims and equivalents thereof.

Methods and apparatuses are disclosed for protecting an aircraft 1 from damage by preventing the aircraft 1 including, for example, an aft tail section 4 and a tail cone 9 from contacting the ground. In certain embodiment, the methods and apparatuses further provide one or more holes for attaching a hook or other anchor structure to secure the aircraft 1 to the ground.

Certain embodiments of the tie-down 10, 40 attach to the aft tail section 4 of the aircraft 1 and provide a contact surface below the aft tail section 4 for contacting the ground. Exemplary aircraft on which embodiments of the tie-down 10, 40 may be included or installed include the T-41, 172, 175, 182, 205, 206, 207, 210, and 210-5 Cessna model aircraft. For example, the tie-down 10 may preferably be for a Cessna (Textron Aviation) 182, 206, 207, and 210 aeries aircraft. The tie-down 40 may preferably be for a Cessna (Textron Aviation) T-41, 172, and 175 series aircraft. These methods and apparatuses are similarly applicable to other aircraft not listed herein.

In certain embodiment, the tie-down 10, 40 comprises a material such as a metal, plastic, fiberglass, metal alloys, or any other material. In certain embodiments, the tie-down 10, 40 comprises aluminum. For example, the tie-down 10, 40 may comprise 6061 aluminum alloy.

Figure 3:
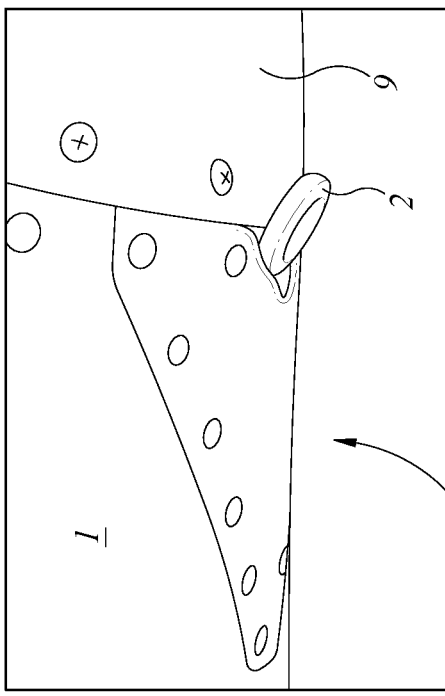
FIG. 3 is a bottom side view similar to FIG. 1 except the tail cone is removed from the aft bulkhead.
Figure 4:
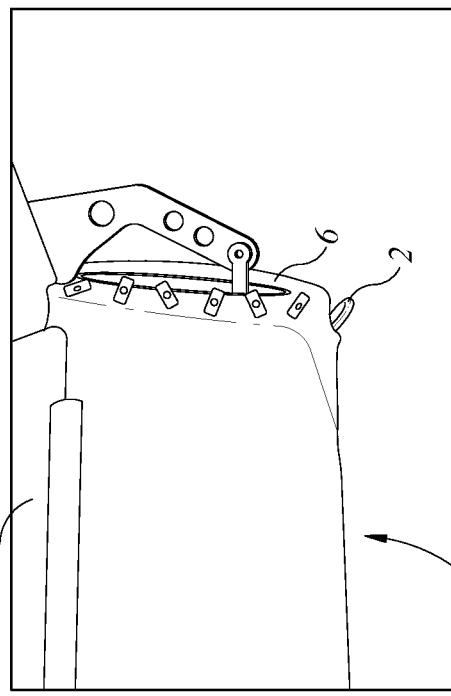
FIG. 4 is a side view of the aircraft from FIG. 3 with a tie-down attached to the aircraft and the tail cone attached to the aft bulkhead just aft of the tie-down according to an embodiment of the present invention.

FIG. 4 is a side view of the aircraft 1 from FIG. 3 with the tie-down 10, 40 attached to the aircraft 1 and the tail cone 9 attached to the aft bulkhead 6 just aft of the tie-down 10, 40 according to an embodiment of the present invention. In certain embodiments, a contact surface 26, 56 of the tie-down 10, 40 illustrated in FIG. 4 includes at least a planar surface generally parallel to the ground. In certain embodiments, the tie-down 10, 40 includes one or more holes 28, 58 for attaching a hook or other anchor structure to secure the aircraft 1 to the ground.

Figure 5:
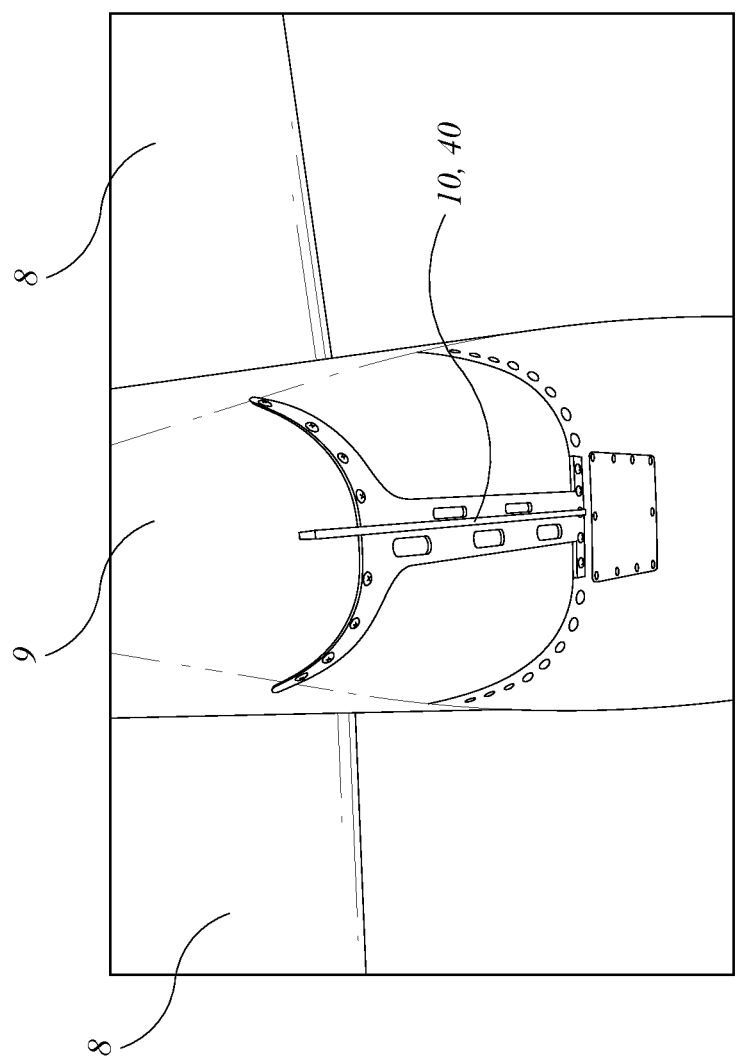
FIG. 5 is a bottom view of the aircraft from FIG. 4 showing the tie-down.

FIG. 5 is a bottom view of the aircraft 1 from FIG. 4 showing the tie-down 10, 40 installed on the aircraft 1. The tie-down 10, 40 can protect the aircraft 1 while also replacing a Cessna's tie down ring 2 as illustrated in FIG. 1. For example, in certain embodiments the tie-down 10, 40 includes one or more holes 28, 48 for attaching a hook or other anchor structure to secure the aircraft 1 to the ground.

The tie-down 10, 40 prevents damage to, for example, the aft bulkhead 6, the horizontal stabilizers 8, vertical stabilizers, rudder, and the tail cone 9 if the aft tail section 4 inadvertently contacts the ground. In contrast, the factory tie down ring 2 can dig into the soil and pull out of the aft bulkhead 6 if it inadvertently contacts the ground.

Figure 2:
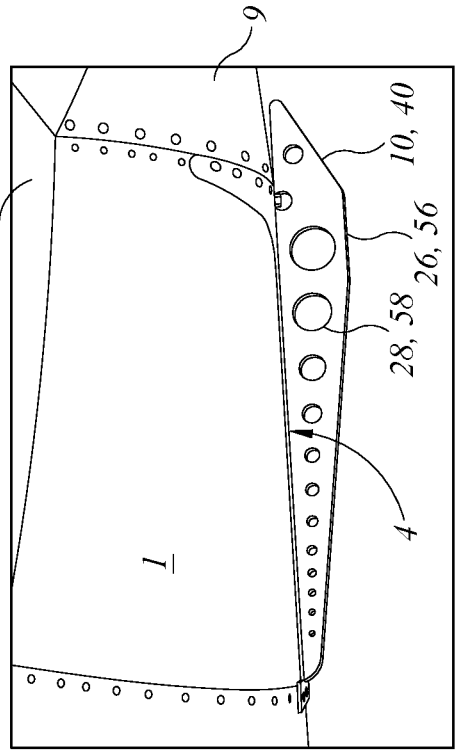
FIG. 2 is a view looking forward of the aircraft from FIG. 1 with a tail cone removed from a damaged aft bulkhead. The damage being caused by contact between the tie down ring and ground.

In certain embodiments, the tie-down 10, 40 attaches to one or more bulkheads. In certain embodiments, one of the one or more bulkheads preferably includes the aft bulkhead 6 illustrated in FIG. 2. In certain embodiments, the tie-down 10, 40 attaches to two bulkheads. For example, the tie-down 10, 40 can attach to a forward bulkhead and the aft bulkhead 6 as is shown in FIGS. 4 and 5.

In certain embodiments, the tie-down 10, 40 is sized and shaped to lift the aft tail section 4 during ground contact. In certain embodiments, the tie-down 10, 40 contacts but does not dig in to the ground. In certain embodiments, the tie-down 10, 40 provides a lower surface which slides across the ground. In certain embodiments, the tie-down 10, 40 is sized and shaped to cradle the aft tail section 4. In certain embodiments, the tie-down 10, 40 reinforces and strengthens the aft tail section 4 including the aft bulkhead 6 to prevent crushing.

Figure 6A:
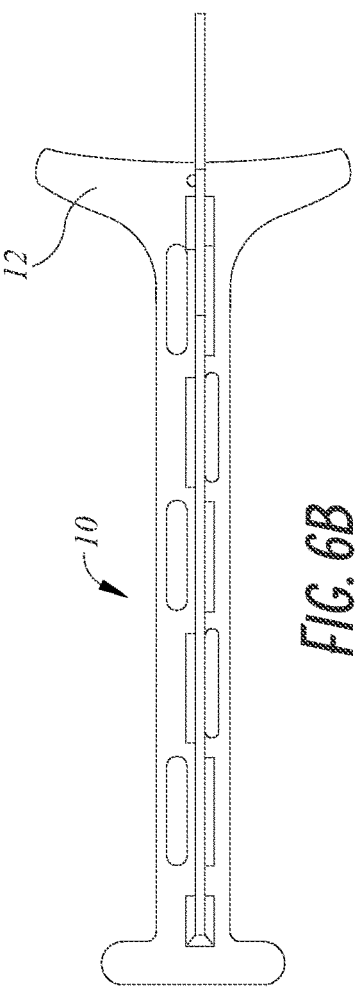
FIG. 6A is a front perspective view of an assembly of an exemplary embodiment of the tie-down from FIG. 4 in which aspects of the present disclosure can be employed and includes a mount member and a projection member.
Figure 6B:
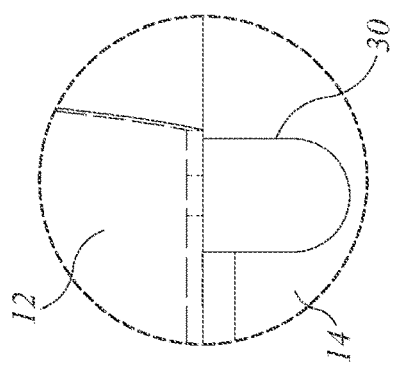
FIG. 6B is a bottom view of the tie-down from FIG. 6A.
Figure 6C:
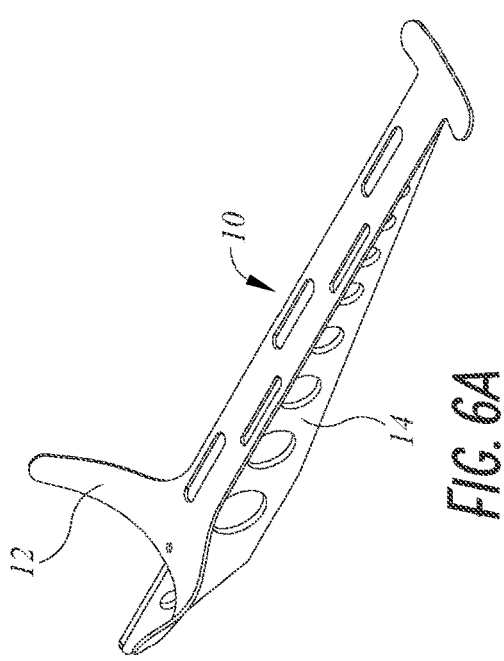
FIG. 6C is a side view of the tie-down from FIG. 6A.
Figure 6D:
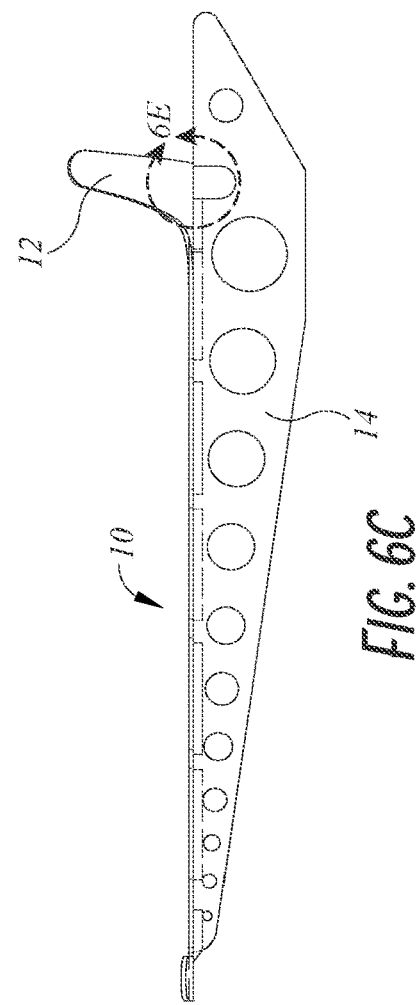
FIG. 6D is an end view of the tie-down from FIG. 6A looking forward.
Figure 6E:
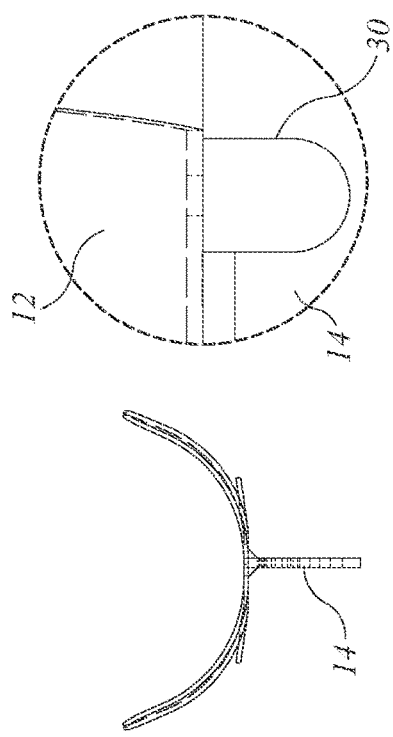
FIG. 6E is an enlarged partial view taken from FIG. 6C and showing a slot which facilitates access for attachment of the tie-down to the aircraft.

FIGS. 6A-6E illustrate various views of an assembly of an exemplary embodiment of the tie-down 10 from FIG. 4 in which aspects of the present disclosure can be employed. FIG. 6A is a perspective view of the tie-down 10. FIG. 6B is a bottom view of the tie-down 10. FIG. 6C is a side view of the tie-down 10. FIG. 6D is an end view of the tie-down 10 looking forward. FIG. 6E is an enlarged partial view taken from FIG. 6C and showing a slot 30 which facilitates access for attachment of the tie-down 10 to the aircraft 1.

In certain embodiments, the tie-down 10 includes a mount member 12 and a projection member 14. The mount member 12 and the projection member 14 are attached together to form the tie-down 10. In certain embodiments, the mount member 12 and the projection member 14 are manufactured as a unitary structure. In certain other embodiments, the mount member 12 and the projection member 14 are separately manufactured and subsequently joined or attached together by, for example, welding, brazing, employing fasteners, employing adhesives, and the like.

FIGS. 7A-7D illustrate various views of the mount member 12 from FIGS. 6A-6E. In certain embodiments, the mount member 12 is 6061 aluminum allow with a thickness of 0.125 inches. Of course other materials and thicknesses are within the scope of this disclosure.

FIG. 7A is a front perspective view of an embodiment of the mount member 12. FIG. 7B is a top view of the mount member 12 from FIG. 7A. FIG. 7C is a side view of the mount member 12 from FIG. 7A. FIG. 7D is an end view of the mount member 12 from FIG. 7A looking forward.

In certain embodiments the mount member 12 includes a body 16. In certain embodiments, the body 16 has one or more regions for attachment to the aircraft 1. In the illustrated embodiment, the body 16 includes a forward wing 18 and an aft wing 20 spaced apart along the body 16. The forward wing 18 is configured to be attached to a forward bulkhead of the aircraft 1 while the aft wing 20 is configured to be attached to a bulkhead aft of the forward bulkhead. In certain embodiments, the bulkhead aft of the forward bulkhead is the aft bulkhead 6 illustrated in FIG. 3. One or more fasteners can be used to attach each of the forward wing 18 and the aft wing 20 to the aircraft 1.

In certain embodiments, the body 16 includes one or more openings or slots 22 disposed in the body 16. In the illustrated embodiment of FIGS. 7A-7D, the body 16 includes five slots 22. Of course the body 16 need not include any slots 22.

In certain embodiments, the body 16 includes one or more holes 24 configured to receive one or more fasteners for attaching the tie-down 10 to the aircraft 1. The one or more holes 24 can be configured as pilot holes. The one or more holes 24 can be in the forward wing 18 and the aft wing 20. While only one hole 24 is illustrated in FIG. 7B, one or more of the one or more holes 24 can be drilled through the body 12 when the tie-down 10 is being fitted to the aircraft 1. In certain embodiments, the body 12 is attached to the aircraft 1 by welding or other attachment techniques instead of or in combination with the use of fasteners.

FIGS. 8A-8B illustrate various views of the projection member 14 from FIGS. 6A-6E. In certain embodiments, the projection member 14 is 6061 aluminum allow with a thickness of 0.25 inches. Of course other materials and thicknesses are within the scope of this disclosure.

FIG. 8A is a side view of the projection member 14. FIG. 8B is a top view of the projection member 14. In certain embodiments, the projection member 14 comprises a contact surface 26. In certain embodiments, the contact surface 26 is spaced sufficiently below the aft tail section 4 so as to prevent contact, for example, of the aft tail section 4 and the tail cone 9 with the ground.

In certain embodiments, the contact surface 26 includes one or more surfaces. In certain embodiments, one or more of the one or more surfaces are planar. In certain embodiments, at least one of the one or more surfaces is parallel to the ground. In certain embodiments, the contact surface 26 is configured to slide across the ground if inadvertent contact occurs with the ground.

In certain embodiments, the projection member 14 comprises one or more holes 28. The one or more holes 28 may reduce the weight of the tie-down 10. In certain embodiments, the projection member 14 comprises a slot 30 disposed relative to the hole 24 in the mount member 12 so as to facilitate access to the hole 24 for attaching the tie-down 10 to the aircraft 1.

In certain embodiments, a hole 32 of the one or more holes 28 is configured as a location for attaching a hook or other anchor structure to secure the aircraft 1 to the ground.

FIGS. 9A-9E illustrate various views of an assembly of another exemplary embodiment of a tie-down 40 in which aspects of the present disclosure can be employed. FIG. 9A is a perspective view of the tie-down 40. FIG. 9B is a bottom view of the tie-down 40. FIG. 9C is a side view of the tie-down 40. As is illustrated in FIG. 9C, the tie-down 40 can include a front oblique surface 41 and a rear oblique surface 43. FIG. 9D is an end view of the tie-down 40 looking aft. FIG. 9E is an enlarged partial view taken from FIG. 9C and showing a slot 60 which facilitates access for attachment of the tie-down 40 to the aircraft 1.

In certain embodiments, the tie-down 40 includes a mount member 42 and a projection member 44. The mount member 42 and the projection member 44 are attached together to form the tie-down 40. In certain embodiments, the mount member 42 and the projection member 44 are manufactured as a unitary structure. In certain other embodiments, the mount member 42 and the projection member 44 are separately manufactured and subsequently joined or attached together by, for example, welding, brazing, employing fasteners, employing adhesives, and the like.

FIGS. 10A-10D illustrate various views of the mount member 42 from FIGS. 9A-9E. In certain embodiments, the mount member 42 is 6061 aluminum allow with a thickness of 0.125 inches. Of course other materials and thicknesses are within the scope of this disclosure.

FIG. 10A is a front perspective view of an embodiment of the mount member 42. FIG. 10B is a top view of the mount member 42 from FIG. 10A. FIG. 10C is a side view of the mount member 42 from FIG. 10A. FIG. 10D is an end view of the mount member 42 from FIG. 10A looking aft.

In certain embodiments the mount member 42 includes a body 46. In certain embodiments, the body 46 has one or more regions for attachment to the aircraft 1. In the illustrated embodiment, the body 46 includes a forward wing 48 and an aft wing 50 spaced apart along the body 46. The forward wing 48 is configured to be attached to a forward bulkhead of the aircraft 1 while the aft wing 50 is configured to be attached to a bulkhead aft of the forward bulkhead. In certain embodiments, the bulkhead aft of the forward bulkhead is the aft bulkhead 6 illustrated in FIG. 3. One or more fasteners can be used to attach each of the forward wing 48 and the aft wing 50 to the aircraft 1.

In certain embodiments, the body 46 includes one or more openings or slots 52 disposed in the body 46. In the illustrated embodiment of FIGS. 10A-10D, the body 46 includes five slots 52. Of course the body 46 need not include any slots 52.

In certain embodiments, the body 46 includes one or more holes 54 configured to receive one or more fasteners for attaching the tie-down 40 to the aircraft 1. The one or more holes 54 can be configured as pilot holes. The one or more holes 54 can be in the forward wing 48 and the aft wing 50. While only one hole 54 is illustrated in FIG. 10B, one or more of the one or more holes 54 can be drilled through the body 42 when the tie-down 40 is being fitted to the aircraft 1. In certain embodiments, the body 42 is attached to the aircraft 1 by welding or other attachment techniques instead of or in combination with the use of fasteners.

Figure 11A:
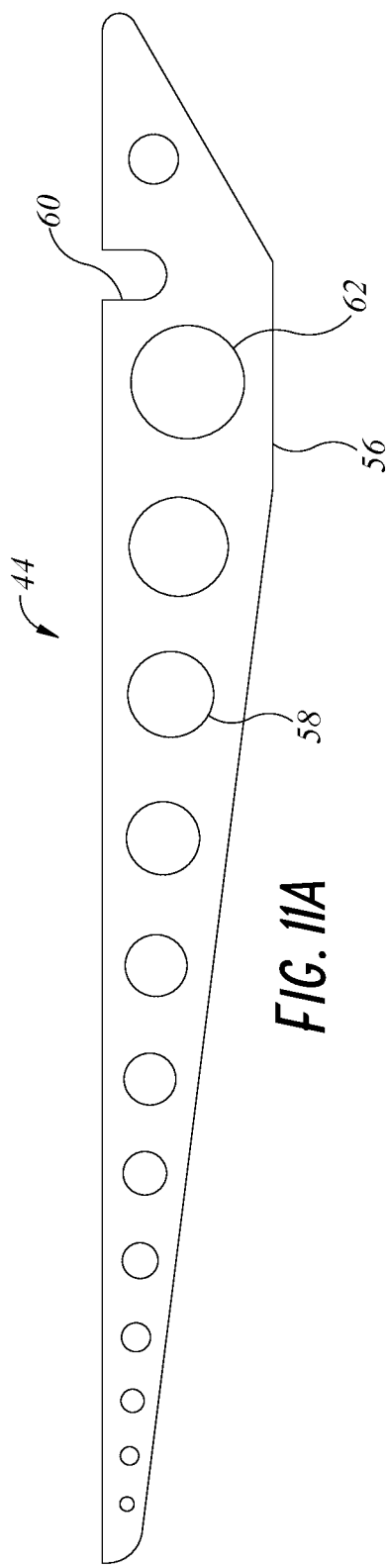
FIG. 11A is a side view of the projection member from FIG. 9A.
Figure 11B:
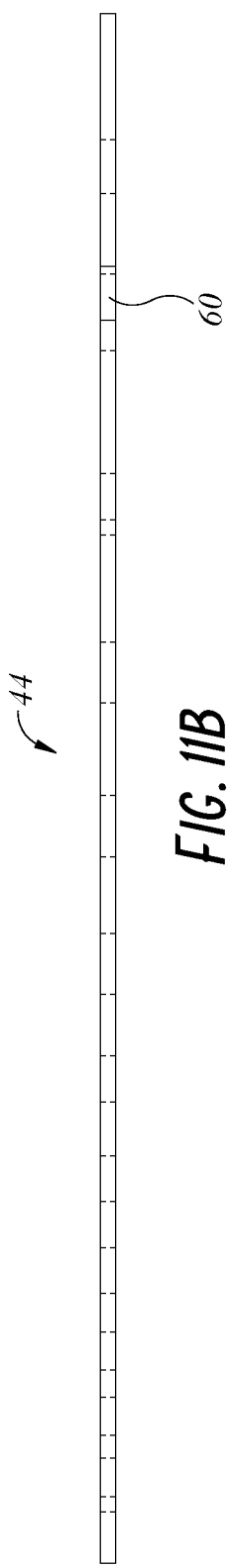
FIG. 11B is a top view of the projection member from FIG. 9A.

FIGS. 11A-11B illustrate various views of the projection member 44 from FIGS. 9A-9E. In certain embodiments, the projection member 44 is 6061 aluminum allow with a thickness of 0.25 inches. Of course other materials and thicknesses are within the scope of this disclosure.

FIG. 11A is a side view of the projection member 44. FIG. 11B is a top view of the projection member 44. In certain embodiments, the projection member 44 comprises a contact surface 56. In certain embodiments, the contact surface 56 is spaced sufficiently below the aft tail section 4 so as to prevent contact, for example, of the aft tail section 4 and the tail cone 9 with the ground.

In certain embodiments, the contact surface 56 includes one or more surfaces. In certain embodiments, one or more of the one or more surfaces are planar. In certain embodiments, at least one of the one or more surfaces is parallel to the ground. In certain embodiments, the contact surface 56 is configured to slide across the ground if inadvertent contact occurs with the ground.

In certain embodiments, the projection member 44 comprises one or more holes 58. The one or more holes 58 may reduce the weight of the tie-down 40. In certain embodiments, the projection member 44 comprises a slot 60 disposed relative to the hole 54 in the mount member 42 so as to facilitate access to the hole 54 for attaching the tie-down 40 to the aircraft 1.

In certain embodiments, a hole 62 of the one or more holes 58 is configured as a location for attaching a hook or other anchor structure to secure the aircraft 1 to the ground.

FIGS. 12-21 and their associated text illustrate an exemplary method for installing the tie-down 10, 40 on a Cessna (Textron Aviation) 182, 206, 207, and 210 series aircraft. This method is similarly applied to installation on other aircraft including Cessna (Textron Aviation) T-41, 172, and 175 series as well as other aircraft not listed herein. For example, the tie-down 10 may preferably be for a Cessna (Textron Aviation) 182, 206, 207, and 210 aeries aircraft. The tie-down 40 may preferably be for a Cessna (Textron Aviation) T-41, 172, and 175 series aircraft.

For example, installation of the tie-down 40 on a 172 series aircraft is similar to installation of the tie-down 10 on a 182 series aircraft. However, there are difference between the 182 series and the 172 series. While some of the more significant differences are described herein for completeness, a person having ordinary skill in the art would be able to modify the 182 series installation method described herein for installation on a 172 series or any other series of aircraft.

For example, while the 172 series does include the aft tail section 4, there is no tail cone 9 attached to the aft tail section 4. Instead, the 172 series has a rudder just aft of the aft tail section 4. The rubber on the 172 series extends down even with the bottom of the aft tail section 4. In this way, the rudder of the 172 series can contact the ground causing damage to the rudder at the same time the tie-down ring 2 is being pulled out of the aft tail section 4 by the ground.

Another difference between the 182 series and the 172 series is the 172 series does not include rivets and holes 80 (see FIG. 18) down the center of the belly between the forward bulkhead 70 and the aft bulkhead 6. Since these rivets are not present, their removal and replacement steps would not apply to a 172 series.

This tail tie-down installation removes the factory tail tie-down ring 2 and replaces it with the tie-down 10, 40 structure that eliminates the single point attachment of the factory tie-down ring 2. In certain embodiments, the tie-down 10, 40 utilizes multiple attachment points at the two most rearward fuselage bulkheads. The installation steps described herein may be performed in various order. A person of ordinary skill in the art would understand that the specific order of the steps described herein may be adjusted and changed. For example, Step B may be described as being after Step A and a person of ordinary skill in the art would understand that in some embodiments Step B may be performed before Step A.

"Forward" and "aft" are used throughout this specification in reference to two rearward bulkheads of the aircraft 1. In certain embodiments and as illustrated in FIG. 12, the two rearward bulkheads are the aft bulkhead 6 and a forward bulkhead 70.

Figure 13:
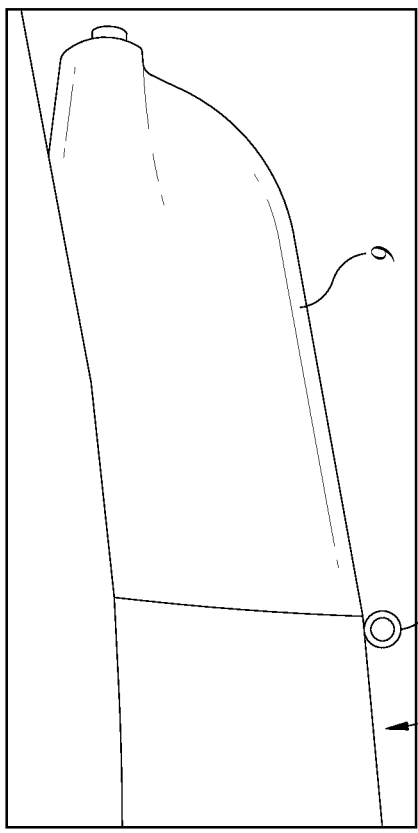
FIG. 13 illustrates a side view of the aircraft of FIGS. 2 and 3, showing the aft tail section with an undamaged tie down ring.
Figure 12:
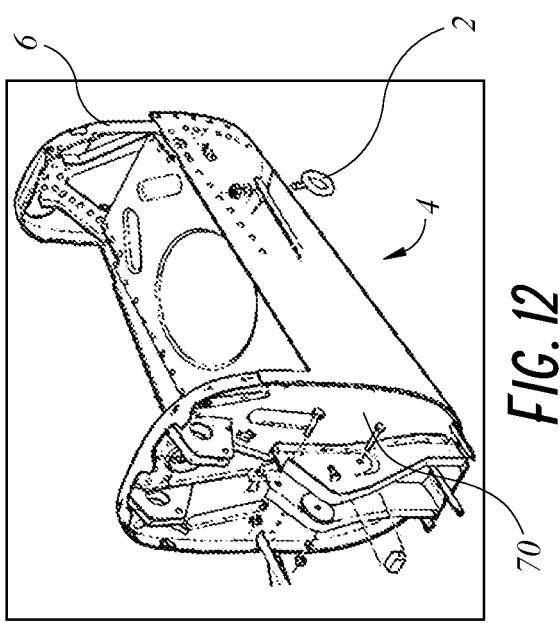
FIG. 12 illustrates a perspective exploded view of an aft tail section of the aircraft of FIGS. 2 and 3 with an undamaged tie down ring.
Figure 14:
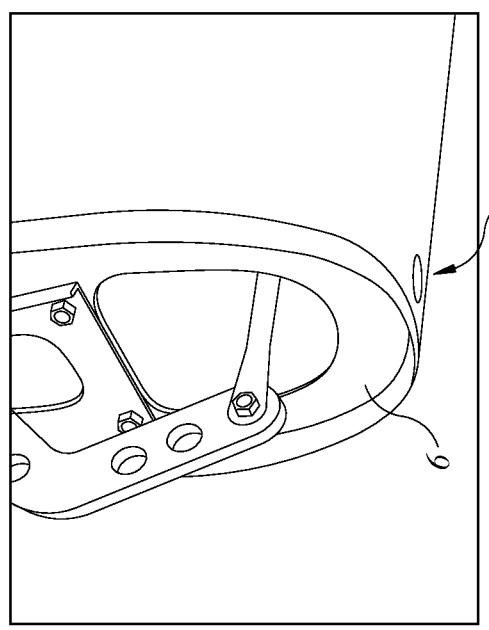
FIG. 14 illustrates a perspective view of the aft tail section of the aircraft of FIG. 13, with the tie down ring and the tail cone removed.

FIGS. 12-14 illustrate the 50. FIG. 12 illustrates an aft tail section 4 of the aircraft 1 with the tie-down ring 2. The tail tie-down ring 2 is a threaded eye-bolt that bolts to the underside of the aft tail section 4 through a hole in the bottom of the aft fuselage bulkhead. One having ordinary skill in the art would understand the tie-down ring 2 is often interchangeably referred to as a "mooring ring," "eyelet," or "eye-bolt." The tie-down ring 2 is removed from the aircraft 1 following the exemplary instructions below. In other embodiments, the tie-down 2 to be removed may be another shape, not necessarily a ring.

FIG. 13 illustrates a side view of the aft tail section 4 of the aircraft 1. During the tie-down ring removal process, the tail cone 9 is removed if present. The tail cone 9 may be removed in accordance with the applicable aircraft maintenance manual. After the tail cone 9 is removed, the aft fuselage bulkhead 6 can be accessed.

FIG. 14 illustrates a perspective view of the aft tail section 4, with the tie down ring 2 and the tail cone 9 removed. After the tail cone 9 is removed, the tie-down ring 2 may be removed. In some embodiments, the tie-down ring 2 may be removed before the tail cone 9 is removed. Any hardware, which accompanies the tie-down ring 2, is also removed from the aft fuselage bulkhead 6. The weight of the removed tie-down ring 2 and accompanying hardware may be measured and used in weight and balance calculations for the aircraft 1 after installation of the tie-down 10, 40.

In some embodiments, the aft fuselage bulkhead 6 has a tie-down ring attachment hole 72. In other embodiments, the attachment hole 72 may be in another part of the aircraft 1. After removal of the tie down ring 2, the tie-down ring attachment hole 72 and surrounding aft bulkhead structure may be inspected for any damage, wear, corrosion, etc. Any necessary repairs may be performed before continuing the installation of the tie-down 10, 40.

FIGS. 15-18 illustrate the tail tie-down installation preparation. During installation preparation, a variety of rivets will need to be removed from the aft tail section 4 between the forward bulkhead 70 the aft bulkhead 6. The number of rivets to be removed varies based on the model aircraft being modified. For example, the 172 series does not include rivets and holes 80 (see FIG. 18) down the center of the belly between the forward bulkhead 70 and the aft bulkhead 6. Since these rivets are not present, their removal and replacement steps would not apply to a 172 series.

A person of ordinary skill in the art would understand how to apply the following description to other models of aircrafts. In some embodiments, the removed rivets will be replaced with countersunk rivets to allow for clearance. In some embodiments, the removed rivets will be replaced with machine screws and nuts used to attach the tie-down 10, 40 to the aircraft 1. In some embodiments, the same rivets may be reinstalled or new universal rivets or other fasteners may be used, including but not limited, AN hardware, bolts, screws, glue, or welding. During the removal process, care should be taken to not oversize or damage the rivet holes. After removal of the rivets, the rivet holes may be inspected and deburred prior to reinstalling the rivets or adding fasteners.

Figure 15:
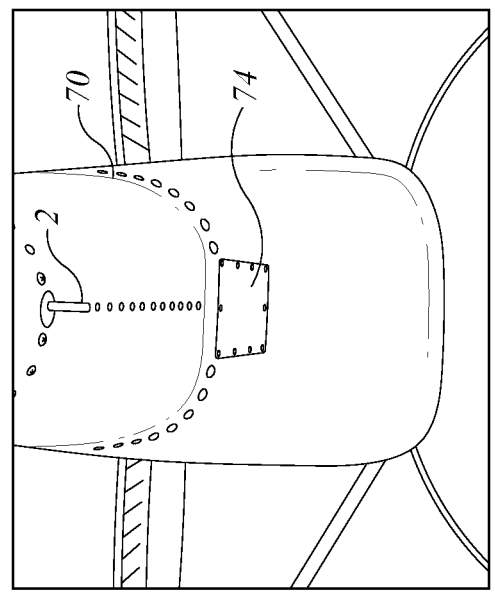
FIG. 15 illustrates a bottom view of the aircraft of FIG. 13, showing an inspection panel.

FIG. 15 illustrates a bottom view of the aircraft 1 of FIG. 13. An inspection panel 74 is located just forward of the forward bulkhead 70. In some embodiments, the aircraft 1 may not have an inspection panel 74 or it may be located in a different position or a different size and shape. In embodiments with an inspection panel 74, the rivets or fasteners holding the inspection panel 74 are removed. The inspection panel 74 is also removed.

Figure 16:
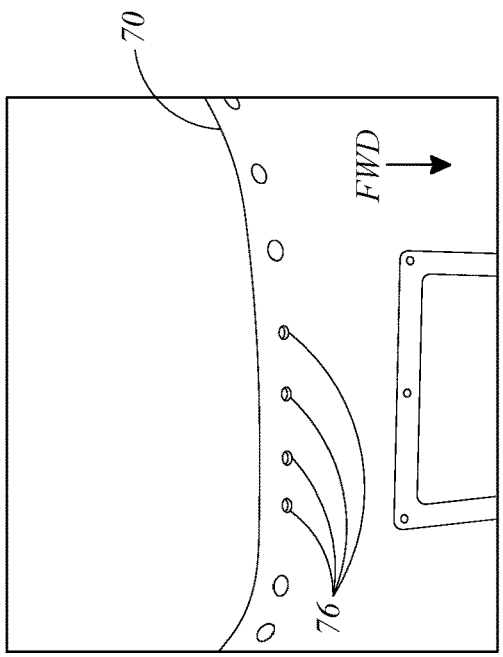
FIG. 16 illustrates a bottom close-up view of the aircraft of FIG. 15, showing a forward bulkhead with rivets and the inspection panel removed.

FIG. 16 illustrates a bottom view of the aircraft 1 of FIG. 13. The forward bulkhead 70 with certain rivets removed leaving holes 76. As shown in FIG. 16, the inspection panel 74 and the rivets that attached the inspection panel 74 have been removed. The most bottom center rivets from the forward bulkhead 70 have also been removed, as shown in FIG. 16. The number of rivets to be removed may depend on the model of the aircraft 1. In some embodiments, there may be four rivets removed, as shown in FIG. 16. In some embodiments, there may be one or more rivets removed. In some embodiments, there may be five rivets removed. In some embodiments, there may be eight rivets removed. In some embodiments, rivets surrounding the most bottom center rivets from the forward bulkhead 70 may be removed. As many rivets as required for proper flush fitment of the tie-down 10, 40 should be removed. After removal of the rivets, the holes 76 may be inspected and deburred prior to reinstalling the rivets or adding fasteners, including but not limited, AN hardware, bolts, screws, glue, or welding.

Figure 17:
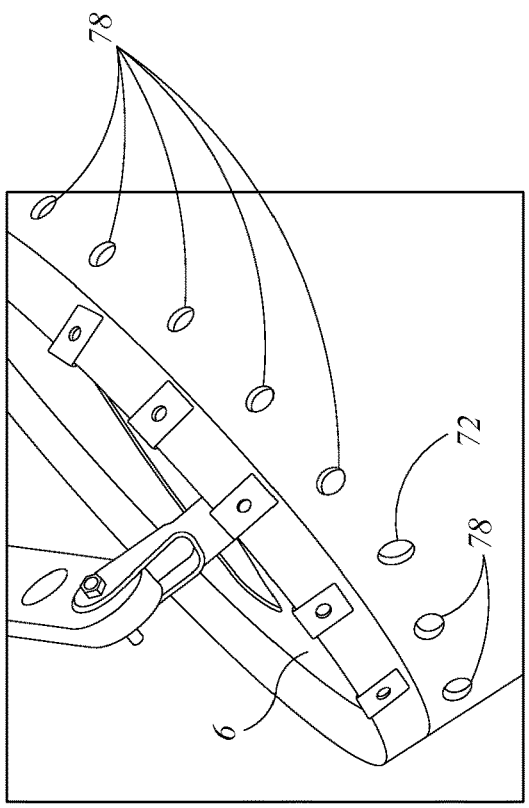
FIG. 17 illustrates a bottom perspective view of the aircraft of FIG. 14, showing the aft bulkhead with rivets removed.

FIG. 17 illustrates a bottom view of the aircraft 1 of FIG. 13. The aft bulkhead 6 is shown with rivets removed leaving holes 78. The most bottom center rivets of the aft bulkhead 6 are removed, as shown in FIG. 17. In some embodiments, the attachment hole 72 marks the bottom center of the rivets to be removed. The number of rivets to be removed may depend on the model of the aircraft 1. In certain embodiments, all rivets that interfere with the flush fitment of the tie-down 10, 40 are removed. The fit of the tie-down 10, 40 to the aircraft fuselage may be tested to determine which rivets should be removed. In some embodiments, there may be eight rivets removed, as shown in FIG. 17, with four rivets on either side of the attachment hole 72. In some embodiments, there may be one or more rivets removed. In some embodiments, there may be four rivets removed. In some embodiments, there may be ten rivets removed. In some embodiments, rivets surrounding the most bottom center rivets from the aft bulkhead 6 may be removed. As many rivets as required for proper flush fitment of the tie-down 10, 40 should be removed. After removal of the rivets, the holes 78 may be inspected and deburred prior to reinstalling the rivets or adding fasteners, including but not limited, AN hardware, bolts, screws, glue, or welding.

Figure 18:
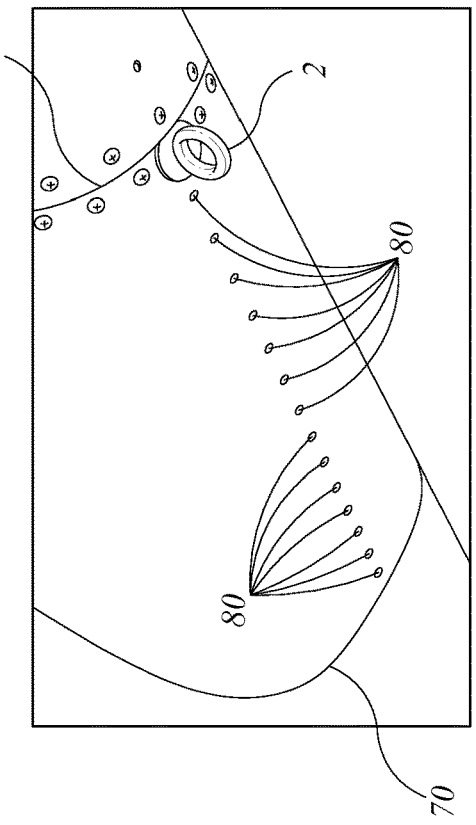
FIG. 18 illustrates a bottom view of the aircraft of FIG. 15 with the tie down ring, showing an embodiment in which rivets should be removed.

FIG. 18 illustrates a bottom view of the aircraft of FIG. 13 with the tie down ring 2 still installed, showing an embodiment in which certain rivets should be removed from holes 80 in the aircraft 1. The rivets along the bottom centerline of the aircraft 1 between the forward bulkhead 70 and the aft bulkhead 6 may be removed, as shown in FIG. 18. The need for and number of rivets to be removed from the underside of the aircraft 1 may vary by aircraft model. In certain embodiments, rivets that interfere with the flush fitment of the tie-down 10, 40 will need to be removed. For example, unlike a 182 series aircraft, the 172 series aircraft does not include rivets and holes 80 (see FIG. 18) down the center of the belly between the forward bulkhead 70 and the aft bulkhead 6. Since these rivets are not present, their removal step would not apply to a 172 series aircraft.

The fit of the tie-down 10, 40 to the aircraft fuselage may be tested to determine which rivets should be removed. After removal of the rivets from the holes 80, the holes 80 may be inspected and deburred prior to reinstalling the rivets or adding fasteners, including but not limited, AN hardware, bolts, screws, glue, or welding. In some embodiments, the removed rivets may be replaced with equivalently sized countersunk rivets. In some embodiments, the removed rivets may be replaced with other fasteners that do not interfere with the flush fitment of the tie-down 10, 40.

Figure 19:
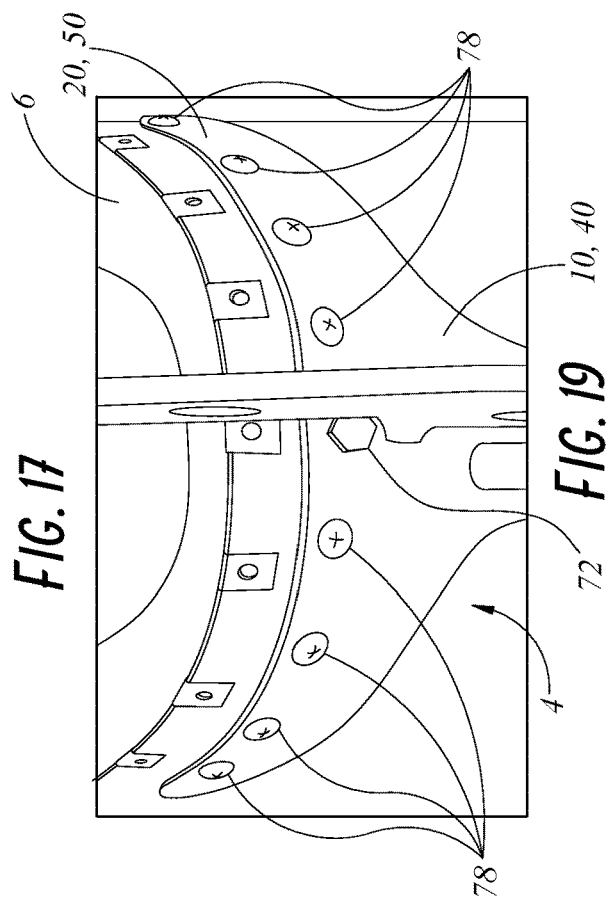
FIG. 19 illustrates a bottom view of the aft bulkhead of the aircraft of FIG. 21, showing the tie-down attachment to the aft bulkhead.
Figure 20:
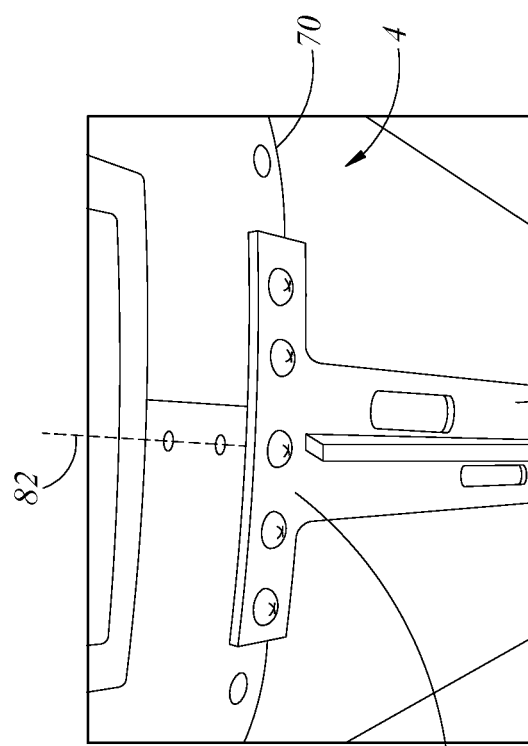
FIG. 20 illustrates a bottom view of the forward bulkhead of the aircraft of FIG. 21, showing the tie-down attachment to the forward bulkhead.

FIGS. 19-20 illustrate the tail tie-down installation. Installation of the tie-down 10, 40 may include fitting the tie-down 10, 40 to the airframe, match drilling the weldment to the preexisting airframe rivet holes, and attaching the tie-down 10, 40 to the airframe. In some embodiments, the tie-down 10, 40 is attached to the airframe using an assortment of AN hardware. In some embodiments, the tie-down 10, 40 is attached using other fasteners, including but not limited to universal head rivets, countersunk rivets, bolts, screws, glue, or welding. The finished installation for a 182 series aircraft can be seen in FIG. 4.

In some embodiments, the weight of the tie-down 10, 40 is measured prior to installation. The weight of the tie-down 10, 40 and accompanying hardware may be measured and used in weight and balance calculations for the aircraft 1 after installation of the tie-down 10, 40.

Figure 21:
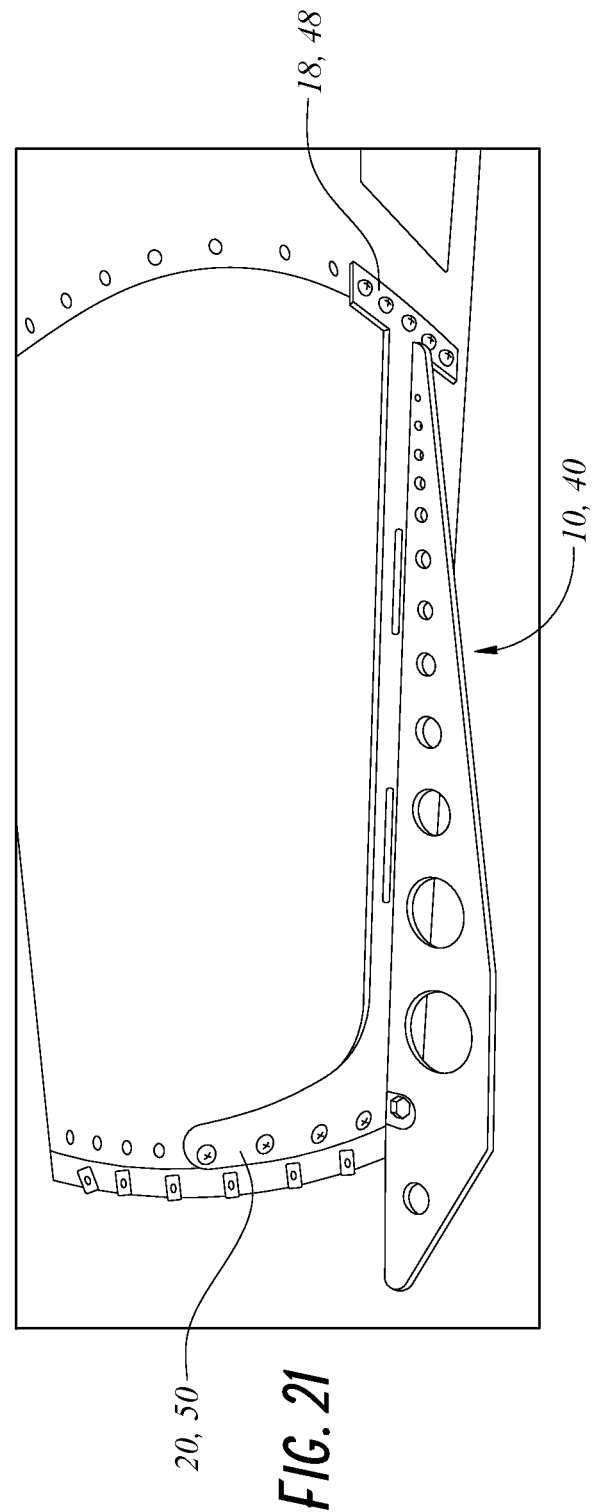
FIG. 21 illustrates an embodiment of the tie-down installed on the aircraft.

In some embodiments, during installation, the tie-down 10, 40 is test fitted and adjusted to fit flush to the airframe, as shown in FIGS. 4 and 21. In some embodiments, the tail tie-down 10, 40 is manufactured to match the curvature of the aft tail section 4 at the forward bulkhead 70 and aft bulkhead 6 attachment points. Due to imperfections and repairs that many aircraft 1 contain, slight manual reforming of the mounting flanges of the tie-down 10, 40 may be necessary for a precise fitment.

FIG. 19 illustrates a bottom view of the aft bulkhead 6 of the aircraft 1 of FIG. 13. The tie-down 10, 40 attaches to the aft bulkhead 6 as shown in FIG. 21. In some embodiments, the tie-down 10, 40 is installed using AN5-7A bolts with AN960-5 washers through holes in the tie-down 10, 40 and the holes 78 located in the aft bulkhead 6, as is illustrated in FIG. 19. The tie-down bolt may be secured using AN960-5 washers as needed and an AN365-524A nut on the inside of the aft bulkhead 6. Final bolt torque can be accomplished in a later step. In some embodiments, other fasteners, including but not limited to universal head rivets, countersunk rivets, bolts, screws, glue, or welding, are used to secure the tie-down 10, 40 to the aft bulkhead 6.

FIG. 20 illustrates a bottom view of the forward bulkhead 70 of the aircraft 1 of FIG. 13. The tie-down 10, 40 is attached to the forward bulkhead 70 as shown in FIG. 21. In some embodiments, after attaching the tie-down 10, 40 at the aft bulkhead 6, the tie-down 10, 40 is attached at the forward bulkhead 70. In some embodiments, the tie-down 10, 40 may be attached to the forward bulkhead 70 before it is attached at the aft bulkhead 6. In some embodiments, the tie-down 10, 40 is aligned along a centerline of the aircraft 1 by centering the forward wing 18, 48 at the forward bulkhead 70 and along a centerline 82 of rivets that were replaced along the underside of the aft tail section 4, as illustrated in FIG. 20. In some embodiments, the forward wing 18, 48 of the tie-down 10, 40 and the forward bulkhead 70 are match drilled using the existing rivet locations. In some embodiments, the forward wing 18, 48 of the tie-down 10, 40 and the forward bulkhead 70 are match drilled using a #20 drill bit.

In some embodiments, the new attachment hardware may slightly larger than the removed rivets from the aircraft 1 and may require match drilling to resize the existing rivet holes. In some embodiments, the tie-down 10, 40 may be attached to the forward bulkhead 70 using other fasteners, including but not limited to AN hardware, universal head rivets, countersunk rivets, bolts, screws, glue, or welding. Prior to installing new fasteners, all drilled holes may be deburred and checked for debris.

In some embodiments, after attaching the tie-down 10, 40 at the aft and forward bulkheads 6, 70, the tie-down 10, 40 is attached to the backside of the forward bulkhead 70. In some embodiments, the attachment to the backside of the forward bulkhead 70 may occur before one or both of the attachments to the aft and forward bulkheads 6, 70. In some embodiments, the forward wing 18, 48 of the tie-down 10, 40 is attached to the airframe using AN525-832R12 machine screws through the tie-down 10, 40 with an AN960-8 washer and AN365-832A nut on the backside of the forward bulkhead 70.

In some embodiments, the tie-down 10, 40 is then attached to the aft bulkhead 6, as shown in FIG. 19. In some embodiments, the aft wing 20, 50 of the tie-down 10, 40 is match drilled to the aft bulkhead 6 using the existing rivet locations. In some embodiments, the tie-down 10, 40 is match drilled using a #20 drill bit. In some embodiments, the aft wing 20, 50 of the tie-down 10, 40 is attached to the airframe using AN525-832R12 machine screws through the tie-down 10, 40 with an AN960-8 washer and AN365-832A nut on the backside of the aft bulkhead 6. In some embodiments, additional AN960-8 washers may be required on the backside for the aft bulkhead 6 to account for variable bulkhead thicknesses. In some embodiments, the tie-down 10, 40 may be attached to the aft bulkhead 6 prior to other attachment steps. For example, the aft wing 20, 50 of the tie-down 10, 40 may be attached to the tie-down ring attachment hole 72 and the holes 78 at the same time. In some embodiments, the aft wing 20, 50 of the tie-down 10, 40 is not attached to the tie-down ring attachment hole 72 and the holes 78 at the same time.

After installing the attachment hardware, the tie-down attachment hardware may be torqued. In some embodiments, the attachment hardware may be torqued after each step. Exemplary torque values are provided below.

| Hardware | Hardware Size | Torque (inch-pounds) |
|---|---|---|
| AN525-832R12 | 8-32 | 12-15 |
| AN365-524A | 5/16-24 | 60-85 |

After installing the tie-down, 40 10, the tail cone 9 and inspection panel 74, if present on the series of aircraft, may be reinstalled in accordance with the applicable aircraft maintenance manual.

After installation, a weight and balance of the aircraft 1 and corresponding center of gravity can be adjusted to accommodate any changes due to the installation of the tie-down 10, 40.

FIG. 21 illustrates an embodiment of the tie-down 10, 40 installed on the aircraft 1. FIG. 21 is a lower perspective view of the aircraft 1 from FIGS. 2 and 3 with the tie-down ring 2 removed and the tie-down 10, 40 installed to the aircraft 1. The tail cone 9 is removed from the aircraft 1 for clarity in FIG. 21.

The illustrated method is only exemplary and is intended to disclose certain steps of which some or all may be employed when installing the tie-down 10, 40. Of course the tie-down 10, 40 may be incorporated into the aircraft 1 during manufacture of the aircraft 1. In such a case, certain steps, such as the removal steps of the tie down ring 2 and tail cone 9 need not be performed.

While the above detailed description has shown, described, and pointed out novel features of the development as applied to various embodiments, it will be understood that various omissions, substitutions, and changes in the form and details of the devices illustrated may be made by those skilled in the art without departing from the spirit of the development. As will be recognized, the present development may be embodied within a form that does not provide all of the features and benefits set forth herein, as some features may be used or practiced separately from others. All changes which come within the meaning and range of equivalency of the claims are to be embraced within their scope.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The term "comprising" as used herein is synonymous with "including," "containing," or "characterized by," and is inclusive or open-ended and does not exclude additional, unrecited elements or method steps.

The above description discloses several methods of installation, manufacture, and materials of the present development. This development is susceptible to modifications in the installations, methods, and materials, as well as alterations in the fabrication methods and equipment. Such modifications will become apparent to those skilled in the art from a consideration of this disclosure or practice of the development disclosed herein. Consequently, it is not intended that this development be limited to the specific embodiments disclosed herein, but that it cover all modifications and alternatives coming within the true scope and spirit of the development as embodied in the attached claims.

While the above detailed description has shown, described, and pointed out novel features of the improvements as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

The methods disclosed herein comprise one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of any claims.

While the foregoing is directed to aspects of the present disclosure, other and further aspects of the disclosure can be devised without departing from the basic scope thereof.

What is claimed is:

1. A method for installing a tie-down to a portion of an aft tail section of an aircraft, the tie-down having a mount member and a projection member, the projection member extending in a generally downward direction from the mount member so as to provide a contact surface with the ground that is lower than the aft tail section to inhibit damage to the aircraft when the aft tail section slides across the ground, the aft tail section having a curved shape, the method comprising:
removing a tail tie-down from the aft tail section of the aircraft;
removing one or more fasteners from the portion of the aft tail section;
fitting the tie-down to the portion of the aft tail section, wherein the mount member comprises a body, a forward wing, and an aft wing, the forward wing and the aft wing extending from the body, the aft wing being curved to match the curved shape of the aft tail section, and wherein the projection member includes a front oblique surface extending from the forward wing to the contact surface and a rear oblique surface extending from behind the aft wing to the contact surface; and
securing the tie-down to the aft tail section with one or more fasteners.

2. The method as in claim 1, wherein the portion of the aft tail section extends from a forward bulkhead to an aft bulkhead of the aircraft.

3. The method as in claim 2, wherein securing the tie-down to the aft tail section uses one or more existing holes in at least one of the forward bulkhead or the aft bulkhead.

4. The method as in claim 3, wherein at least one of the one or more existing holes is disposed down a center of a belly between the forward bulkhead and the aft bulkhead.

5. The method as in claim 3, wherein the one or more fasteners removed from the portion of the aft tail section are removed from the one or more existing holes.

6. The method as in claim 3, further comprising match drilling at least one of the one or more existing holes.

7. The method as in claim 3, further comprising inspecting and deburring at least one of the one or more existing holes.

8. The method as in claim 1, further comprising removing and replacing a tail cone from the aircraft.

9. The method as in claim 1, further comprising removing and replacing an inspection panel from the aircraft.

10. The method as in claim 1, wherein the tie-down fits flush against the aft tail section.

11. The method as in claim 1, wherein the aircraft is a general aviation aircraft.

12. A method for installing a tie-down to a portion of an aft tail section of an aircraft, the tie-down having a mount member and a projection member, the projection member extending in a generally downward direction from the mount member so as to provide a contact surface with the ground that is lower than the aft tail section to inhibit damage to the aircraft when the aft tail section slides across the ground, the aft tail section having a curved shape, the method comprising:
fitting the tie-down flush against a portion of the aft tail section, wherein the mount member comprises a body, a forward wing, and an aft wing, the forward wing and the aft wing extending from the body, the aft wing being curved to match the curved shape of the aft tail section, and wherein the projection member includes a front oblique surface extending from the forward wing to the contact surface and a rear oblique surface extending from behind the aft wing to the contact surface; and
securing the tie-down to the aft tail section with one or more fasteners.

13. The method of claim 12, further comprising:
removing a tail tie-down from the aft tail section of the aircraft; and
removing one or more rivets from the portion of the aft tail section.

14. The method of claim 12, wherein the mount member contacts the aft tail section when the tie-down is secured to the aft tail section.

15. The method of claim 12, wherein the contact surface is a lower edge of the projection member.

16. The method of claim 12, wherein the mount member is sized and shaped to substantially cover at least a lower portion of the aft tail section.

17. The method of claim 12, wherein the tie-down is manufactured from aluminum.

18. A method for installing a tie-down to a portion of an aft tail section of an aircraft, the tie-down having a mount member and a projection member, the projection member extending in a generally downward direction from the mount member so as to provide a contact surface with the ground that is lower than the aft tail section to inhibit damage to the aircraft when the aft tail section slides across the ground, the aft tail section having a curved shape, the method comprising:
fitting the tie-down to a forward bulkhead and an aft bulkhead so as to fit flush against the aft tail section of the aircraft, wherein the mount member comprises a body, a forward wing, and an aft wing, the forward wing and the aft wing extending from the body, the aft wing being curved to match the curved shape of the aft tail section, and wherein the projection member includes a front oblique surface extending from the forward wing to the contact surface and a rear oblique surface extending from behind the aft wing to the contact surface; and
securing the tie-down to the aft tail section with one or more fasteners.

19. The method of claim 18, wherein at least a portion of the tie-down is sized and shaped to cradle the aft bulkhead.

20. The method of claim 18, wherein the tie-down is sized and shaped to reinforce and strengthen at least the aft bulkhead.

* * * * *